UNITED STATES PATENT OFFICE.

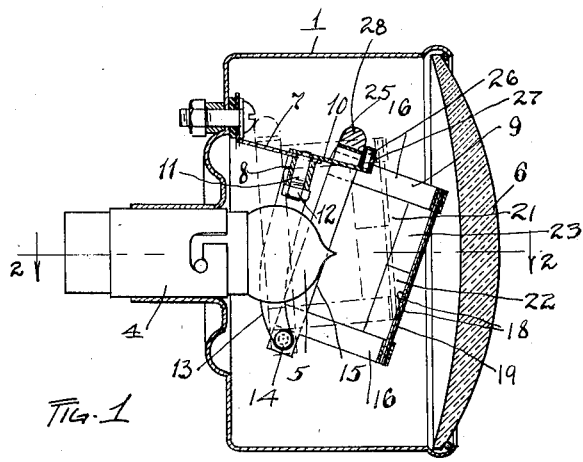
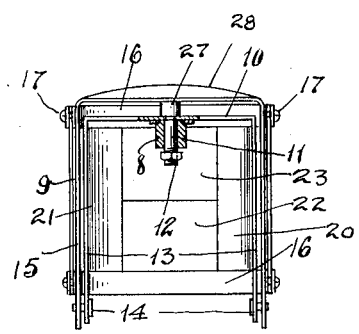
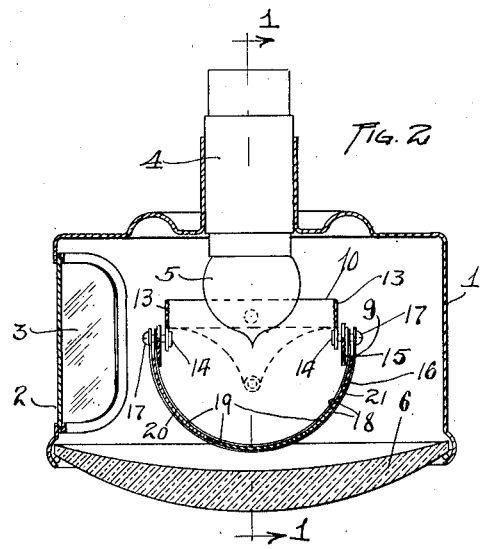
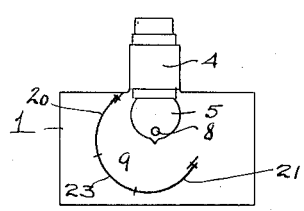
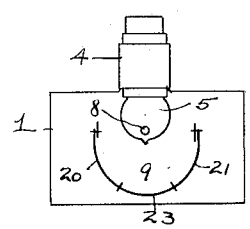
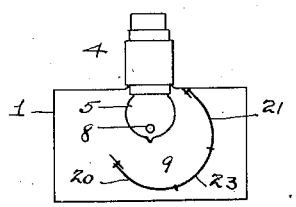
INVENTOR
Frederick W. Wakefield
By Fay, Oberlin & Fay.
ATTORNEYS

FREDERICK W. WAKEFIELD, OF VERMILION, OHIO, ASSIGNOR TO THE F. W. WAKEFIELD BRASS COMPANY, OF VERMILION, OHIO, A CORPORATION OF OHIO.

VEHICLE-LAMP.

1,330,562.      Specification of Letters Patent.      Patented Feb. 10, 1920.

Substitute for application Serial No. 166,824, filed May 7, 1917. This application filed May 31, 1918. Serial No. 237,479.

*To all whom it may concern:*

Be it known that I, FREDERICK W. WAKEFIELD, a citizen of the United States, and a resident of Vermilion, county of Erie, and State of Ohio, have invented a new and useful Improvement in Vehicle-Lamps, of which the following is a specification, the principle of the invention being herein explained and the best mode in which I have contemplated applying that principle, so as to distinguish it from other inventions.

The present invention relates to automobile lamps such as are used on the rear of motor cars to illuminate the license and to project a red, or warning signal rearwardly of the machine. In such a lamp, together with such usual accomplishments, I have incorporated means for signaling to the drivers of the following cars. This signaling means is entirely automatic in its action, and operates to indicate changes in speed and direction.

Heretofore many signaling devices have been employed, but all required operation by the driver of the vehicle, and thus distract his attention from the road ahead. It is particularly true that the times when the driver of an automobile would like most to signal his intentioned actions to following machines, as when he is in a tight place in traffic, or has to make quick stops, are the times when he can least afford to use the time necessary for operating a signaling device. In my present combined lamp and signal, I have provided means for automatically flashing a warning signal when the car is slowed down, or when any change is made in direction, so that drivers of cars following may be warned. These warning signals do not take time or attention of the driver of the car equipped with my device, and the knowledge that the oncoming machines are warned allows the driver to concentrate his entire attention upon the operation of the vehicle and the traffic conditions he is negotiating. The present application is a substitute for my application Serial No. 166,824, filed May 7, 1917. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1 is a vertical section through the lamp on the line 1—1, Fig. 2; Fig. 2 is a horizontal section on the line 2—2, Fig. 1; Fig. 3 is a rear elevation of the hood showing the construction of the supporting bracket in section; and Figs. 4, 5 and 6 are diagrammatic views showing the positions of the hood.

The present lamp consists of the usual casing 1 provided with a slot 2 in one side, over which is fitted the usual white glass 3 through which issues the light for illuminating the license number. The position of this slot and the shape of the casing are, of course, immaterial. The casing is provided with the usual lamp socket 4 and connections, as well as with the usual light bulb 5, and will, of course, also be provided with any suitable means for positioning the casing on the car. In the face of the casing a lens 6 will be mounted and this lens will be preferably of magnifying type and will be of white glass instead of the red glass usually employed. By the use of a magnifying or projecting lens, as the color of the light changes, it will give a flash which can be clearly seen by one looking at the car from the rear.

Inside of the casing is mounted a small supporting bracket 7, attached to the back of the casing and located centrally over the lamp bulb, and this bracket at its outer end is provided with an elongated tube 8 or other suitable aperture inclined at a slight angle to the vertical. A movable hood 9 consisting of two frame members pivotally attached together will be mounted on the support carrying arm. The first frame member is an inverted U-shaped member 10 having a downwardly extending threaded pin 11 adapted to be inserted in the tube or aperture so that the frame will be pivotally mounted on the bracket 7 about an axis slightly inclined to the vertical. This inverted U-shaped member will be held in place by a nut 12 threaded on the pin below the tube, or by any other suitable means. The two downwardly extending arms 13 of this member curve slightly toward the magnifying lens and have at their lower extremities small pins or studs 14. Upon these studs is mounted a second frame member 15, which consists of two side bars connected together by semi-circular bands 16 at the top and bottom. The outer band of each pair will be held in place by small screws 17 at the ends, and between these bands will be mounted colored lens or other suitable transparent material. As shown, the colored material consists of two thin sheets 18 of clear isinglass or the like, between which are mounted thin strips of colored isinglass 19. As illustrated, these strips comprise a blue strip 20 at the left, a green one 21 at the right, and two strips 22 and 23 of different shades of red, in the center. The particular color arrangement is not essential, but illustrates one convenient method of obtaining a satisfactory color combination.

On the bar of the first frame member is mounted a forwardly extending arm 25, having an upwardly extending lug 26 upon which is mounted a bumper 27 of some suitable material, such as rubber, in order to reduce the noise. The second frame member has a weighted cross-bar 28 at the top which will be normally positioned back of the bumper on the first frame member. The normal position of these two members is that shown in full lines in Fig. 1, but the hood is so balanced that the weighted bar tends to hold the second member either in its normal position or in the warning position in dotted outline in the same figure.

Turning to the operation of the lamp, it will be seen that the hood is capable of pivotal movement about both an inclined and a horizontal axis. In its normal position, that is, while the vehicle is moving, the lamp bulb will throw light through the upper half 23 of the central strip giving a deep red light through the magnifying lens. If the car is suddenly slowed down, the hood will be pivoted about its horizontal axis, and the light will be flashed through the lower half 22 of the middle strip, thus changing the color of the red light shown. Any acceleration of the vehicle will, of course, move the frame back to its normal position.

If the car turns either to the right or to the left the frame will be pivoted about the inclined axis thus bringing either the green strip 21 or the blue strip 20 in front of the bulb, and changing the color of the light projected rearwardly. In this way it will be seen that the device automatically operates upon either a change in the velocity of the car or a change in the direction of the car. On a rough road flashes of different colored light will, of course, be often shown, but this will be of great benefit to the driver of the car following, as the light will show the usual red warning signal (usually) between the flashes of other colors.

It will be readily seen that as the device operates automatically upon changes in car speed or direction, it will serve to warn drivers of approaching vehicles without requiring any attention by the driver, thus allowing him to concentrate his attention upon the automobile and the road. This feature is particularly valuable as the times when the use of warning signal is most imperative, such as when a quick stop or a short turn must be made to avoid some object, are the times when the driver can least afford to take his attention from the road and the car, to operate a signal.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a vehicle lamp, the combination of a lamp casing having an opening, a vari-colored member movably mounted adjacent such opening, said member being adapted to vary the color seen upon movement through such opening, and means whereby said movable member is moved by changes in velocity or direction of the vehicle.

2. In a vehicle lamp, the combination of a lamp casing having an opening, a member having portions of different colors movably mounted adjacent such opening, said member being adapted upon movement to bring the different colored portions into view through such opening, and means whereby said movable member is moved by changes in velocity or direction of the vehicle.

3. In a vehicle lamp, the combination of a lamp casing having an opening, a light source in said casing, a vari-colored member movably mounted in said casing between said light source and such opening, and means whereby said movable colored member is moved by changes in velocity or direction of said vehicle.

4. In a vehicle lamp, the combination of a lamp casing having an opening, a light source in said casing, a vari-colored member pivotally mounted in said casing about both horizontal and inclined axes, between said light source and such opening.

5. In a vehicle lamp, the combination with a lamp casing and a light source therein, of a projecting lens, a vari-colored hood pivotally mounted about an axis inclined to the vertical, said hood being weighted to tend to maintain its normal position.

6. In a vehicle lamp, the combination with a lamp casing and a light source therein, of a projecting lens, a vari-colored hood pivotally mounted about an axis inclined to the vertical, said hood being weighted and being adapted to return to its normal position after displacement.

7. In a vehicle lamp, the combination with a lamp casing and a light source therein, of a lens mounted in such casing, a hood pivotally mounted about an inclined axis between said light source and said lens, said hood having vertical sections of different colors, and being weighted to normally position one of such sections between said lens and such light source, such weight tending to return said hood to its normal position after displacement.

8. In a vehicle lamp, the combination with a lamp casing and a light source therein, of a lens mounted in such casing, a hood pivotally mounted about an inclined axis between said light source and said lens, said hood being pivotally mounted about a horizontal axis and having limited movement about the same, said hood being so positioned as to return to its normal central position about the inclined axis upon removal of force of inertia.

9. In a vehicle lamp, the combination with a lamp casing and a light source therein, of a lens mounted in said casing, a hood having both vertical and horizontal sections of different colors, pivotally mounted in said casing about both a horizontal and an inclined axis, said hood being adapted to be moved about said axes by changes in velocity and direction of the vehicle to bring such different colored sections between said light source and said lens, said hood being so weighted and positioned as to return to its normal position upon removal of the forces of inertia.

10. In a vehicle lamp, the combination with a casing and a light source therein, of a lens in said casing and a hood pivotally mounted about both an inclined and a horizontal axis between said lens and said light source, said hood having transparent vertical sections of different colors and tending to return to its normal position upon being displaced by inertia of the vehicle.

11. In a vehicle lamp, the combination with a lamp casing having a source of light and a lens, of a transparent hood having horizontal divisions of different colors, said hood being pivoted at its lower part about a horizontal axis and having a weighted upper portion, stops adapted to limit movement of said hood both sides of the vertical, said hood being in unstable equilibrium and being adapted to be acted on by the force due to change in vehicle velocity to move about said horizontal axis to bring the different colored divisions between said light source and said lens.

12. In a vehicle lamp, the combination of a lamp casing having a light bulb, a lens in one end of said casing, a support on the rear of said casing and a movable hood pivotally mounted on said support about both inclined and horizontal axes between said bulb and said lens, said hood being divided both vertically and horizontally into portions of different colors.

13. In a vehicle lamp, the combination of a lamp casing having a light bulb, a lens in one end of said casing, a support on the rear of said casing and a movable hood pivotally mounted on said support about both inclined and horizontal axes between said bulb and said lens, said hood having a series of vertical transparent portions of different colors, the center portion being divided horizontally into two portions of different colors.

Signed by me, this 23rd day of May, 1918.

FREDERICK W. WAKEFIELD.